United States Patent [19]
Shiue et al.

[11] Patent Number: 5,735,393
[45] Date of Patent: Apr. 7, 1998

[54] EYEGLASS RETAINER/COVER

[76] Inventors: Chih Cheng Shiue, 4713 Shadwell Pl., San Diego, Calif. 92130; Frank Hermansen, 181-A Costa Mesa St., Costa Mesa, Calif. 92627; Jenny Shei, 4713 Shadwell Pl., San Diego, Calif. 92130; Carl A. Winefordner, 181-A Costa Mesa St., Costa Mesa, Calif. 92627

[21] Appl. No.: 711,270

[22] Filed: Sep. 9, 1996

[51] Int. Cl.⁶ .......................... A45C 11/04; A45C 11/06
[52] U.S. Cl. .................................. 206/5; 493/480
[58] Field of Search ............................ 206/5; 493/480, 493/914, 937, 186, 210; 224/181, 257; 24/3.3, 3.4, 3.7, 3.8; 351/158

[56] References Cited

U.S. PATENT DOCUMENTS

| | | |
|---|---|---|
| 3,827,790 | 8/1974 | Wenzel ........................ 24/3.3 |
| 4,133,604 | 1/1979 | Fuller . |
| 4,541,696 | 9/1985 | Winger et al. . |
| 4,863,013 | 9/1989 | Eastman . |
| 4,953,695 | 9/1990 | Tallman . |
| 4,965,913 | 10/1990 | Sugarman ........................ 24/3.3 |
| 5,014,846 | 5/1991 | Walker et al. . |
| 5,032,018 | 7/1991 | McCulley et al. . |
| 5,102,216 | 4/1992 | Mitchell . |
| 5,129,106 | 7/1992 | Liou . |
| 5,151,778 | 9/1992 | Conley ........................ 206/5 |
| 5,299,682 | 4/1994 | Tatar . |
| 5,366,072 | 11/1994 | Goldenberg . |
| 5,414,907 | 5/1995 | Kiapos ........................ 24/3.3 |
| 5,593,024 | 1/1997 | Seiler ........................ 206/5 |

*Primary Examiner*—Jacob K. Ackun
*Assistant Examiner*—Anthony Stashick
*Attorney, Agent, or Firm*—Richard C. Litman

[57] ABSTRACT

A eyeglass retainer/cover is an integral combination eyeglass pouch and a neck strap fabricated from a single strip of flexible and stretchable fabric. The invention can be used to either retain eyeglasses on the neck strap or the integral pocket be stretched over folded eyeglasses to act as a cover for protection, storage, and cleaning when not being utilized as a neck strap. The eyeglass retainer/cover is easily constructed and has a stylish appearance because the integral eyeglass pocket folds into itself when not in use.

6 Claims, 2 Drawing Sheets

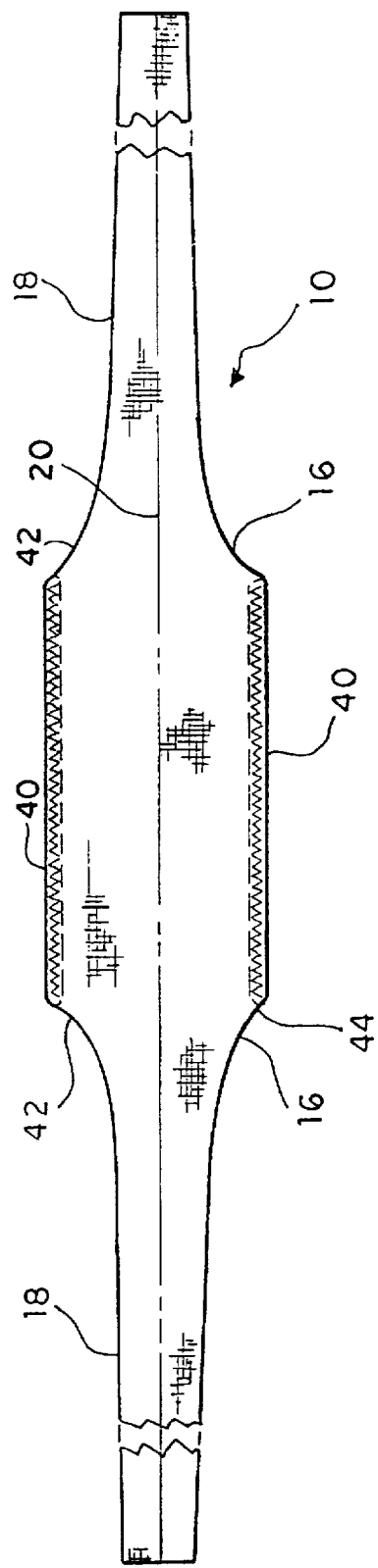
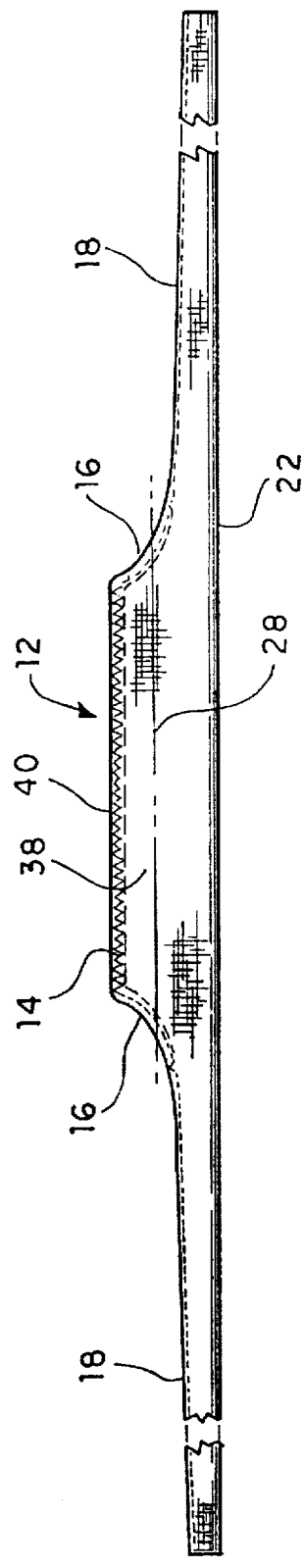
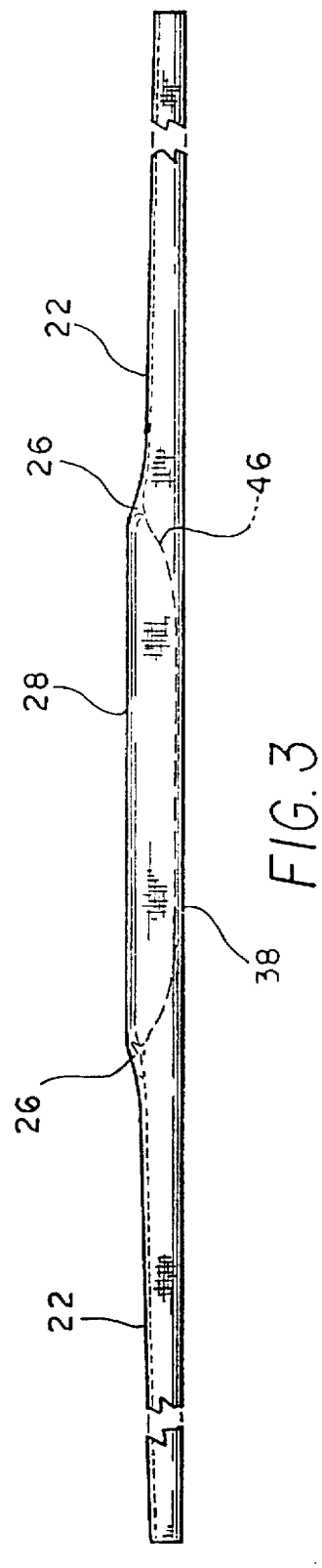

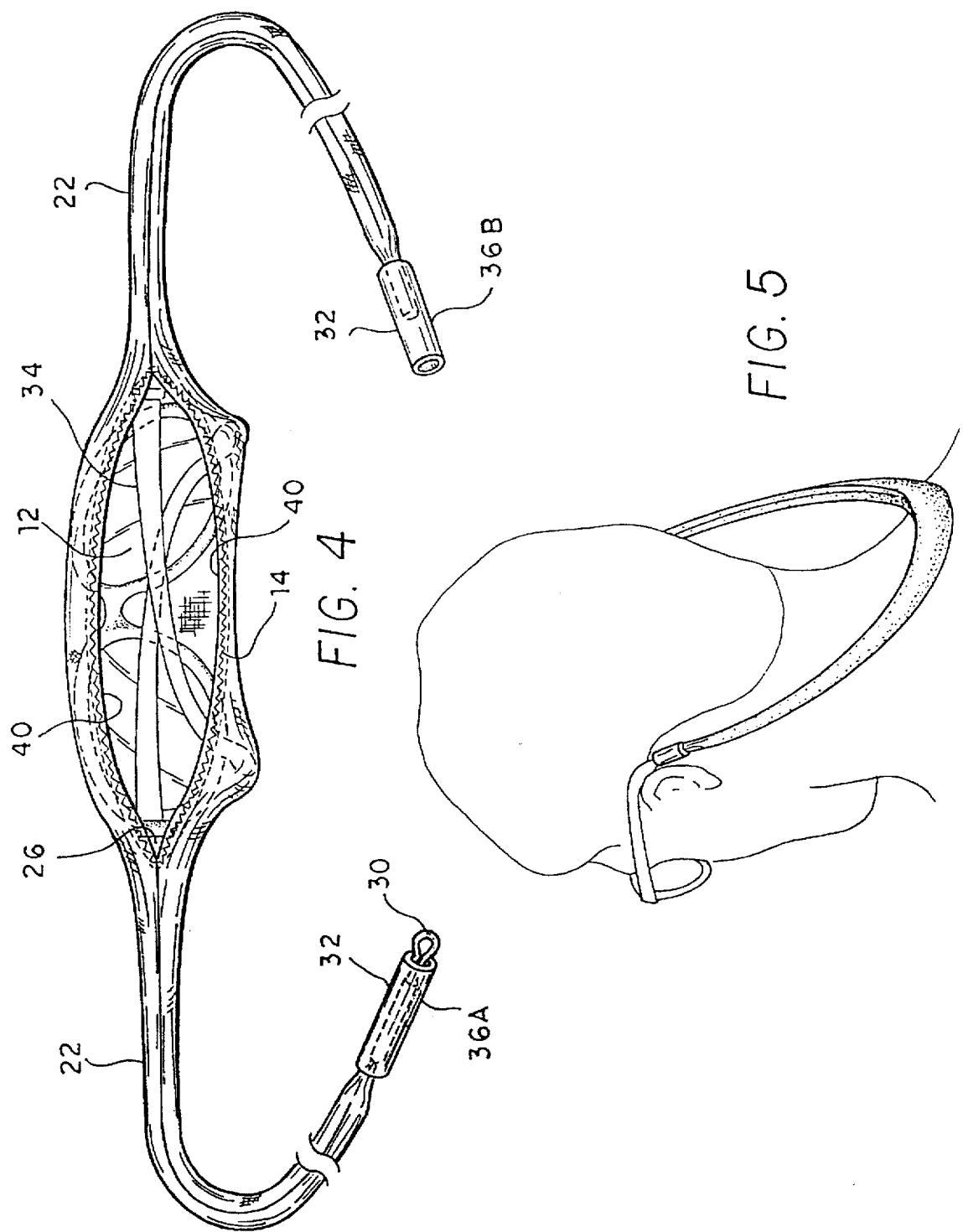

EYEGLASS RETAINER/COVER

BACKGROUND OF THE INVENTION

1. Field of the Invention

The present invention relates to an integral combination eyeglass pocket in a neck strap. More specifically, the invention is an eyeglass retaining neck strap fabricated from a single strip of flexible and stretchable cloth material that can be stretched over a user's eyeglasses to act as a cover for protection, storage, and cleaning when not being utilized as a neck strap.

2. Description of Prior Art

Some of the more relevant prior art include the inventions disclosed in U.S. Pat. No. 4,133,604 of Fuller, U.S. Pat. No. 4,541,696 of Winger et al., U.S. Pat. No. 4,863,013 of Eastman, U.S. Pat. No. 4,953,695 of Tallman, U.S. Pat. No. 5,014,846 of Walker et al., U.S. Pat. No. 5,032,018 of McCulley et al., U.S. Pat. No. 5,102,216 of Mitchell, U.S. Pat. No. 5,129,106 of Liou, U.S. Pat. No. 5,299,682 of Tatar, and U.S. Pat. No. 5,366,072 of Goldenberg.

Upon review of the patent references, it is noted that eyeglass protective pouches and retaining straps have been the subject of earlier patents. Most notably, the patent to Mitchell discloses a combination eyeglass pouch and retaining strap, including a stretch fabric piece which is first rolled and then sewn at a pair of stitch lines which segments the pouch portion from a tubular strap extending from each side of the pouch. A first disadvantage of the Mitchell invention resulting from the rolled features, and overcome by the present invention, is the lack of readily observable surface area for application of printed matter. The rolled feature hinders continuous readability of printed matter when the invention is in use. Because Mitchell requires that his device be unrolled to create the storage pouch, a second disadvantage of having to manipulate the pouch before inserting the glasses is apparent. Unlike the present invention, the Mitchell pouch lacks a throat to allow immediate insertion of the glasses into the pouch.

Other less relevant patents are noted. The patent to Walker et al. discloses an eyeglass strap connected to its protective pouch by a "tether means". The patent to Goldenberg also discloses a separate storage pouch in combination with a neck strap. Fuller, Winger, McCulley, and Liou generally disclose just an eyeglass retaining strap, while Eastman discloses just a stretchable fabric glass case. Tallman and Tartar disclose combinations of case and container.

None of the above inventions and patents, taken either singularly or in combination, is seen to describe the instant invention as claimed. Thus a eyeglass retainer/cover solving the problem of integrity, convenience, simplicity of construction and user comfort is desired.

SUMMARY OF THE INVENTION

Eyeglasses, especially those with popular lightweight plastic lenses, are susceptible to scratching and deformation, and should be protected by an enclosure when not in use. However, most enclosures are cases which are bulky and independent of the eyeglasses, and subject to being misplaced or just inconvenient baggage, especially when one is in sports attire with limited pocket space. Moreover, there are many occasions, especially in sport participation, that there is interest in securing eyeglasses to the user to assure that the glasses do not fall off; for example, in water sports. Hence, it is seen that an integral glasses cover and retainer is a viable commercial product. The integration of the two functional entities of glasses cover and retainer may be achieved through the utilization of highly stretchable and elastic fabrics, cut and sewn to have a folded pocket within the band which fastens to the earpiece of the eyeglasses.

The eyeglass retainer/cover is cut from a single length of stretchable and elastic fabric which is wide enough and long enough in a center segment pocket to wrap about an eyeglass frame and has symmetrical straps which taper to its ends. The tapered ends are sewn closed from its extremity to the wide center segment. The wide center segment may be edge hemmed with a stretch stitch to form a pocket with selvage. The stitched unit may also be reversed by pulling both tapered ends through to the wide section and out of the pocket. This is a standard operation in the sewing art known as "turning". The turning produces a blind inside seam stitch and converts the tapered straps into tapered tubes. The wider center section may be folded inwardly so as to be no broader than the taper junction at the throat in the formed pocket. The entire unit may be pressed and permanently creased. Small elastic string loops or elastic tubing lengths are attached to the extremities and those loops or tubing lengths are used to grasp the earpiece of the glasses.

The eyeglass retainer/cover produced is a continuous band of relatively narrow stretch material with a hidden folded pocket in its center. When it is not being used to retain eyeglasses to the head of its user, the eyeglasses may be slipped inside the pocket. By inserting the eyeglasses into the pocket, the upper section of the pocket that had been folded inside the pocket cavity slips outwardly and around the eyeglass frame and the corner edges of the frame at the earpiece hinge is held in the throats of the pocket formed at the junction of the tubes and the pocket. This functional design makes optimum use of the inherent properties of the stretch fabric currently available by assuring permanent folds to complement a stylish shape as a retainer and an elasticity to envelop the pocket as a cover about the frame of the eyeglasses. In addition, the fabric also has a tendency to resist soiling, so it may be used to wipe the lenses clean. It is economically cut and stitched from a single continuous strip of stretch fabric. When worn, the eyeglass retainer/cover has smooth flowing and continuous lines, giving it a stylish appearance.

Accordingly, it is a principal objective of the eyeglass retainer/cover invention to incorporate into a single stylish compact product both a eyeglass cover to protect the frame and lenses of a pair of eyeglasses and a eyeglass retainer to secure a pair of glasses to the head and neck of a user.

It is another objective of the eyeglass retainer/cover invention to design an eyeglass retainer/cover which may be easy to produce from a single strip of fabric and stitch together in a minimum number of operations.

It is an objective of the invention to provide improved elements and arrangements thereof in an eyeglass retainer/cover for the purposes described which is inexpensive, dependable and fully effective in accomplishing its intended purposes.

These and other objectives of the present invention will become readily apparent upon further review of the following specification and drawings.

BRIEF DESCRIPTION OF THE DRAWINGS

FIG. 1 is a plan view of the eyeglass retainer/cover pattern with stretch stitched pocket hem.

FIG. 2 is a side plan view of eyeglass retainer/cover pattern folded along the longitudinal center fold line and fabric straps stitched.

FIG. 3 is a side plan view of eyeglass retainer/cover after fabric is turned and pocket folded in.

FIG. 4 is a top view of eyeglass retainer/cover with a pair of glasses inserted into the pocket and two different ear piece grasps connected to the tubes.

FIG. 5 is a perspective rear shoulder view of the eyeglass retainer/cover worn as a retainer.

DETAILED DESCRIPTION OF THE PREFERRED EMBODIMENT

The eyeglass retainer/cover may be used to retain a pair of glasses to the head or neck of a person or for the storage of the glasses inside an integral folded pocket. The eyeglass retainer/cover is preferably constructed from a single length of stretch fabric pattern of tapered straps semiarching into a wider pocket section. The preferred embodiment of the invention is formed by hemming the pocket section, folding the fabric along the longitudinal center line, seaming the straps, and converting the straps into gently tapered tubes with a blind stitch by turning the fabric through the pocket. Earpiece grasp means are then attached to the tubes and the upper section of the pocket is folded inwardly and press formed into a fold that is not much wider than the tapering tubes. Retention of eyeglasses is achieved by the grasping means clasped to the fabric tubes. To retain eyeglasses to the head or neck of the wearer, the grasps on the ends of the tubes are attached to the earpiece of the glasses, thereby completing a loop with the glasses which may be hung around the neck or worn, the retainer assuring the wearer that his eyeglasses will not fall away from him.

Referring now to FIG. 1, FIG. 2 and FIG. 3 in succession, the specific structure of the retainer/cover can be appreciated by a description of its manufacture. A fabric pattern 10 has a pocket section 12 which has adequate width and length to envelop an eyeglass frame and symmetrically joins to a right and left tapered fabric strap 18 through respective semiarches 16. The pocket section 12 then receives a pocket hem and stretch stitch 14 to form selveged edges 40. The pattern 10 is then folded about the longitudinal center line 20 and at least the semiarches 16 are seamed, preferably by stitching upper edge 42 to lower edge 44 of semiarch sections 16 to form respective throats 26, as shown in FIG. 2. Preferably the straps 18 also receive a seam. A pocket fold line 28 is noted about which a flap 46 of the pocket section 12 is folded to define folded pocket section 38.

In the preferred embodiment the straps do have a seam, whereby each extremity of the straps 18 may then be fed through its own interior and the entire fabric of the pattern 10 is turned through the pocket 12, converting each strap 18 into a slightly tapered tube 22 with a blind seam, as shown in FIG. 3. Then flop 46 of the pocket 12 may be folded inwardly about the pocket fold line 28, and this folded pocket section 38 is inserted down into the pocket and may be form pressed in place. The semiarch, preferably after fabric turning and pressing, becomes a throat 26 at the junction of a corner of the pocket section 12 where the tube 22 and semiarch 16 meet.

As suggested with reference to description of the prior art, the throat performs a critical function. The throat 26 allows immediate insertion of the glasses into the pocket section 12 without the need to unduly manipulate the pocket section, as by unrolling. For storage of glasses, the frames of a pair of glasses may be held in one hand near one end and the other end inserted into either throat 26 at one corner of the pocket section 12. With the first end of the glasses being so inserted, the folded pocket section may be manually and with minimal manipulation be spread open to allow the opposing throat 26 and the pocket section 12 to be stretched over the frame, thereby allowing the pocket to engage the top and bottom of the eyeglass frame, as shown in FIG. 4.

Moreover, while removing the glasses from the pocket section 12, a one step manual tug by grasping each end of straps 18,18 closes the pouch and returns it to its original shape. To assure such return to shape by such manipulation, the permanent fold added by pressing the pocket section 12 along center line 20 adds a memory to the fabric.

As shown in FIG. 4, earpiece grasp means may then be attached to the extremity of the tube 22. FIG. 4 illustrates two types of earpiece grasp means. On the right tube is shown an annular piece of elastic tubing 32 which is bound to the fabric tube 22 forming one of the means of a earpiece grasp 36B. This elastic tubing may be slipped over the end of the eyeglass earpiece in a firm grasp for retaining the glasses. Shown on the left tube 22, another grasp means 36A is shown which is a loop 30 of elastic string which is clasped by a clasping means to the fabric tube. The clasping means can be a metal crimp band, or other means known in the prior art. Over this crimp or clasping means is a piece of annular elastic tubing 32 which may be slipped down snug to noose the loop 30. This means of earpiece grasp 36A may be slipped at any position on the body of the earpiece of the eyeglasses, so that the retainer may be held closer to the back of the head, giving a more secure position of the eyeglasses to the face.

FIG. 4 also illustrates a pair of folded eyeglasses 34 which has been inserted into the eyeglass retainer/cover pocket 12. The pocket 12 is opened and a corner of the frame by the earpiece hinge of the glasses 34 is inserted into the pocket throat 26. When this is done, the folded pocket section 38 puckers about the frame of the eyeglasses and the pocket hem and stitch 14 slip over the top and bottom of the frame of the glasses. The securing of glasses in the pocket occurs as the other corner of the pocket is stretched over the other free edge of the frame, and that edge pops into the other throat 26 of the pocket 12. The frame of the folded eyeglasses 34 is now secured inside the pocket by the inherent resiliency of the stretch fabric. The eyeglasses may remain attached to the earpiece grasp means 36A or 36B when pocketing the eyeglasses in the above manner.

FIG. 5 is a pictorial showing the eyeglass retainer/cover being worn as a eyeglass retainer. The pocket 12 is not noticeable because the folded pocket section 38 remains folded about its pocket fold line 28 because of the inherent characteristic of stretch fabrics holding creases pressed into them. As a result, since the pocket is partly folded into itself, the wider pocket section is only a short and smooth looking continuation of the tapered tube 22, presenting a neat and smooth tapered appearance.

We claim:

1. An eyeglass retainer/cover comprising:
    a pattern of resilient fabric including
        a central pocket section having a width and selvaged pocket edges,
        a right strap and a left strap, each said strap having a width smaller than the width of said central pocket section and ending at a terminus, and
        a right tapered semiarch section joining said central pocket section with said right strap and a left tapered semiarch section joining said central pocket section with said left strap, each said semiarch section including an upper edge and a lower edge;
        a seam joining the upper edge and the lower edge of each said semiarch section, thereby defining a generally funnel-shaped throat, said central pocket section including a flap formed between a pocket fold line and the selvaged pocket edges, said flap foldable inwardly into said pocket section about said pocket fold line for retaining a pair of eyeglasses within said pocket section; and a glasses earpiece grasping means joined to the terminus of each said strap.

2. The eyeglass retainer/cover according to claim 1, wherein said pattern is formed as a single strip.

3. The eyeglass retainer/cover according to claim 1, wherein each of said straps is formed as a tube depending from said throat.

4. The eyeglass retainer/cover according to claim 1, wherein said pattern further includes a longitudinal fold line press set to form a permanent fold.

5. The eyeglass retainer/cover as defined in claim 1 wherein said earpiece grasping means comprises an annular piece of elastic tubing firmly attached to each of said straps.

6. The eyeglass retainer/cover as defined in claim 1 wherein said earpiece grasping means comprises:

a loop of string material;

a clasping means cinching said loop to each of said straps; and a piece of tubing slidingly attached over each said clasping means and said strap such that the loop protrudes from said piece of tubing;

whereby the loop is allowed to grasp the body of an earpiece and the elastic tubing is noosed down on the loop securing the loop tightly to the earpiece.

* * * * *